United States Patent
Simmons

(10) Patent No.: US 7,437,181 B2
(45) Date of Patent: Oct. 14, 2008

(54) IDENTITY MODULE FOR TERMINAL EQUIPMENT USING PREPAID APPLICATIONS

(75) Inventor: Clayton Simmons, Valley Ranch, TX (US)

(73) Assignee: Nokia Corporation, Espoo (FI)

( * ) Notice: Subject to any disclaimer, the term of this patent is extended or adjusted under 35 U.S.C. 154(b) by 743 days.

(21) Appl. No.: 10/449,138

(22) Filed: May 29, 2003

(65) Prior Publication Data

US 2004/0043792 A1   Mar. 4, 2004

Related U.S. Application Data

(60) Provisional application No. 60/406,522, filed on Aug. 28, 2002.

(51) Int. Cl.
*H04M 1/00* (2006.01)
(52) U.S. Cl. .................... 455/558; 455/550.1
(58) Field of Classification Search ............ 455/558, 455/550.1, 435, 420, 560, 561, 557, 41, 344, 455/426, 432; 709/249, 220; 710/10
See application file for complete search history.

(56) References Cited

U.S. PATENT DOCUMENTS

| | | | | |
|---|---|---|---|---|
| 5,301,234 A | * | 4/1994 | Mazziotto et al. | 380/247 |
| 5,600,708 A | | 2/1997 | Meche et al. | 379/59 |
| 5,748,720 A | * | 5/1998 | Loder | 455/406 |
| 5,907,804 A | | 5/1999 | Schroderus et al. | 455/411 |
| 5,956,633 A | | 9/1999 | Janhila | 455/410 |
| 6,415,142 B1 | * | 7/2002 | Martineau | 455/411 |
| 6,427,073 B1 | | 7/2002 | Kortesalmi et al. | 455/414 |
| 2002/0177407 A1 | * | 11/2002 | Mitsumoto | 455/41 |
| 2003/0119554 A1 | * | 6/2003 | Horn | 455/558 |
| 2004/0235524 A1 | * | 11/2004 | Abuhamdeh | 455/558 |
| 2004/0266482 A1 | * | 12/2004 | Juntunen | 455/558 |
| 2005/0048950 A1 | * | 3/2005 | Morper | 455/410 |

* cited by examiner

*Primary Examiner*—Melody Mehrpour
(74) *Attorney, Agent, or Firm*—Harrington & Smith, PC

(57) ABSTRACT

A system according to an embodiment of this invention provides for binding an identification card to terminal equipment so that the card cannot be used in any other equipment. A unique challenge will be initiated by the ID card to externally authenticate the terminal device by generating a random value and sending it to the terminal device (the longer the value the more secure the challenge will be). While the terminal device is executing this random value it received form the ID card, the ID card will perform it=s own computation using the same algorithm the terminal device has and the random value it sent to the terminal device plus a fixed key programmed in the ID card, whose value matches that of the fixed key in the terminal device. If the terminal device=s response value which is passed back to the ID card matches the response value generated in the ID card, computation then the ID card is then free to initialize according to the GSM specifications. If the value is different, then the ID card may report to the end-user that the terminal device used is invalid.

32 Claims, 3 Drawing Sheets

|   |   | (OPTIONS) |
|---|---|---|
| 20-1 | START (e.g. TURN POWER ON) |   |
| 20-2 | MS SENDS INITIATING SIGNAL TO SIM | (SIGNAL IDENTIFIES HOST AS BEING A MS, OPTIONALLY INCLUDES IMEI) |
| 20-3 | SIM FETCHES KEY FROM LIST | (SIM COMPARES IMEI WITH STORED DATA, PROCEEDS ONLY IF THIS MS HAS THE CORRECT IMEI) |
| 20-4 | SIM SENDS KEY IDENTIFIER TO MS |   |
| 20-5 | SIM SENDS RANDOM NUMBER TO MS |   |
| 20-6 | SIM PROCESSES RANDOM NUMBER WITH KEY |   |
| 20-7 | MS PROCESSES RANDOM NUMBER WITH KEY |   |
| 20-8 | MS SENDS RESULT TO SIM |   |
| 20-9 | SIM COMPARES THE TWO RESULTS |   |
| 20-10 | IF THE RESULTS ARE THE SAME, OPERATION PROCEEDS | IF THE RESULTS ARE NOT THE SAME, SIM NOTIFIES USER |

FIG.3

IDENTITY MODULE FOR TERMINAL EQUIPMENT USING PREPAID APPLICATIONS

CLAIM OF PRIORITY TO PROVISIONAL PATENT APPLICATION

This patent application claims priority under 35 U.S.C. 119(e) from U.S. Provisional Patent Application No. 60/406,522, filed Aug. 28, 2002, incorporated by reference herein in its entirety.

FIELD OF THE INVENTION

This invention pertains in part to communication systems. In particular, the invention relates to terminal devices employing an identity module.

BACKGROUND OF THE INVENTION

Terminal equipment such as satellite receivers, set-top boxes, Wi-Fi access points, mobile telephones and the like, referred to generally as terminal devices, contain an electronic identity module referred to in general as an identity module (IM) or ID unit, more specifically user identity module (UIM) or R-UIM. Some identity modules may be referred to as smart cards. Mobile telephones, particularly those based on the Groupe Speciale Mobile (GSM) Standards, contain an electronic module, known as a subscriber identity module or SIM. The SIM can be either a smart card, which has the well-known size of credit cards, or alternatively it can be in a much smaller format, called a "plug-in SIM. The latter format is more suitable for handportable terminal equipment. Although, all the of the terms identity module (IM), user identity module (UIM) or R-UIM. may be used, hereinafter the term SIM will be used for convenience to reference all terms referring to a module or ID unit, of whatever physical form, that contains data identifying the account and/or the user or subscriber. However, the use of the term SIM should not to be deemed as limiting in any way.

A mobile telephone may also be referred to as a mobile terminal or more generally a mobile station (MS), which includes a mobile equipment (ME) plus the SIM. Hereinafter the term mobile equipment (ME) will be used. However, this term is not deemed to be limited. For example, embodiments of the present invention may be used in relation to a satellite receiver or similar set-top box, which may not be mobile.

The SIM stores data to be used by the terminal equipment. The SIM is pre-configured to contain a unique identifier for a particular user, and may also contain appropriate authentication functions. The SIM is also able to store temporary data such as paging messages and a number directory.

In current GSM based systems, the subscriber identity is not linked to the mobile station (MS). The connection between the subscriber and the MS is accomplished by the use of the SIM. The SIM is a module, or smart card, that installs in the ME and has a unique user identity information. In the case of a prepaid card, the issuer typically does not inquire as to the identity of the customer, so that the smart card contains information identifying to the network only the wholesale account of the issuer of the prepaid card and the source of the call is identified only by the IMEI, discussed below.

GSM based systems allow users to insert their SIM card into any mobile station and be recognized by the GSM network via information on the SIM rather than information associated with the particular terminal in use. In this system, the mobile equipment is identifiable by an IMEI (International Mobile Equipment Identity); however, queries to check this information are 'expensive' in terms of processing and are not normally verified on a per call basis.

U.S. Pat. No. 5,907,804 issued to Schroderus et al. on May 25, 1999, assigned to an entity owned by the assignee of the present invention and incorporated herein by reference defines a method and apparatus for checking the identification number of a mobile subscriber. Schroderus et al. describes embodiments in which the subscriber identities and terminal equipment are permanently connected to each other as mobile stations and in which subscribers and terminal equipment are not permanently connected together.

In the GSM system, the codes relative to the operator of the network and the user (customer) of the telecommunication network have been stored in the so called SIM. The SIM is generally a part of a so called SIM card having an electric coupling system for attaching the card to the mobile equipment. The SIM includes, for example, the information required for the communication concerning the user, the telecommunication network to be used, and the encryption of the radio data transmission. The SIM includes also the customer's invoicing data to be transferred to the telecommunication network simultaneously with the call from the mobile station. In this way the user can use the SIM card as needed in different mobile equipment, unless the use of the mobile equipment is restricted, for example, so that the mobile station can be used only if a SIM card of a certain operator or prepaid service is inserted into it. If the use of the mobile station or some of its features is restricted in the above mentioned way, the restriction will be implemented with codes stored in the SIM.

Currently, the pre-paid purse or value resident on the SIM card could be used indefinitely without exhausting the stored number of prepaid minutes when inserted in a standard GSM terminal because a standard terminal is not required by the GSM specification to have means for decrementing the number of prepaid minutes. The MS transmits to the network information from the SIM card, such as the identity of the wholesale account that has paid for a bulk quantity of network time. The amount of time used by an individual subscriber will not ordinarily exceed that bulk time during the course of a call, so that any monitoring mechanisms in the network will not be alerted. In a prepaid scenario, it is necessary that the smart card (SIM) only work with the terminal equipment or group of terminal devices that support the pre-paid decrementing engines (or equivalently that the SIM does not work with a ME that does not have a decrementing engine). Currently the GSM specification does not define a procedure to allow the pre-paid subscription card or other tangible medium that stores the number of pre-paid minutes to challenge a terminal device in which it is inserted and to reject a terminal device that does not support the decrementing of stored units.

Therefore, there is a fundamental problem with pre-paid applications utilizing the GSM technology where value is stored in the SIM card. The GSM specification allows the MS to recognize and allow/disallow registration with certain SIM cards for carriers that realize sunken costs within subsidization models, but there is nothing specified to date that allows for the SIM to recognize and allow or disallow registration with certain terminal devices.

The pre-paid carriers will load certain SIMs with arbitrary values to be used as airtime and those values will be decremented in conjunction with the ME=s prepaid engines whose job is to calculate and pass such timing data. Therefore it will always be necessary for a pre-paid SIM to be mated with a ME having a pre-paid engine; otherwise the pre-paid SIM could be inserted into any GSM ME and make free calls without any decrementation of value.

U.S. Pat. No. 5,748,720 issued to John Loder on May 5, 1998, assigned to an entity owned by the assignee of the present invention and incorporated herein by reference defines a removable subscriber identification module for a mobile radio terminal. An ability to hold a record of the amount of funds prepaid for at the point of sale is incorporated within a SIM. This payment record will progressively decrease as services of the network are used according to a tariff rate which is which is either preprogrammed into the SIM or sent by the network. The SIM monitors the remaining value of the payment and, when the value of the payment reaches a predetermined minimum value, prevents further calls. This blocking of the mobile station MS may be effected by a specific blocking command outputted to a mobile equipment part of the mobile station, or by disabling network operation functions, such as authentication algorithms in the SIM, or by not sending a specific acknowledgment to the network. U.S. Pat. No. 5,600,708 issued to Meche at al. on Feb. 4, 1997, assigned to the assignee of the present invention and incorporated herein by reference defines a mechanism and method by which a mobile station which has been determined to be stolen can be locked to the SIM inserted in the unit and thereby be made less valuable in terms of re-sale. The mobile station (MS) of Meche et al. is locked to the SIM by an over-the-air command. Additionally, the Meche et al. invention provides a system wherein a SIM inserted in a mobile station may be locked to the mobile station=s IMEI, thereby making the SIM usable only in the mobile station to which it is locked. The Meche et al. invention requires queries to determine if the IMEI is on a list of stolen or otherwise unacceptable mobile stations. Thus, there is a need for an apparatus and method where only approved pre-paid MS=s are used in conjunction with their pre-paid SIM cards.

Other art assigned to an entity of the assignee of the present invention and incorporated herein by reference are:

U.S. Pat. No. 5,956,633 issued to Pertti Janhila on Sep. 21, 1999.

U.S. Pat. No. 6,427,073 issued to Kortesalmi et al. on Jul. 30, 2002.

SUMMARY OF THE INVENTION

A system according to an embodiment of this invention provides an apparatus and method wherein a SIM containing data on prepaid time may challenge the terminal device MS prior to reporting its IMEI value to the MS, so that the terminal device can make calls only if it is capable of decrementing the stored value.

A feature of the invention is a verification sequence in which the SIM tests or challenges the equipment within which it is placed to ascertain if the equipment contains means for decrementing the stored value in the SIM.

Another feature of the invention is the provision within the SIM of means to decide if the terminal in question is valid and to suppress or stop operation if the response of the terminal is not acceptable.

Another feature of the invention is compatibility with more than one model or manufacturer of ME, so that a given SIM may be used with more than one ME.

Yet another feature of the invention is compatibility with standard-format smart cards, so that a generic smart card may be used with a mobile station and a pre-paid telephone SIM may be used in a retail store that has an appropriate exchange agreement with the supplier of the SIM and that has compatible hardware to decrement the stored value in the SIM. These and other features, aspects, and advantages of embodiments of the present invention will become apparent with reference to the following description in conjunction with the accompanying drawings. It is to be understood, however, that the drawings are designed solely for the purposes of illustration and not as a definition of the limits of the invention.

BRIEF DESCRIPTION OF THE DRAWINGS

FIG. 3 is a flow chart illustrating an optional version of an identity module authenticating a mobile station.

DETAILED DESCRIPTION

In the following description, the control of the right of use of a mobile terminal will be exemplified in the GSM system (Global System for Mobile Communications). The GSM system is used as an exemplar environment only, and the invention may also suitable for other systems which use identity modules.

In the GSM system used as an example, the International Mobile Equipment Identity code IMEI is saved in the permanent memory of the mobile equipment when manufacturing the device. The code includes a Type Approval Code TAC, a Final Assembly Code FAC and a serial number. The code is for each mobile station individually unique. When starting a communication or during it, the data transmission network can request the IMEI code of the mobile station and compare it with a register of authorized and/or unauthorized mobile stations. The IMEI code is used, for example, for preventing the use of stolen or defective mobile stations.

Figure 1:
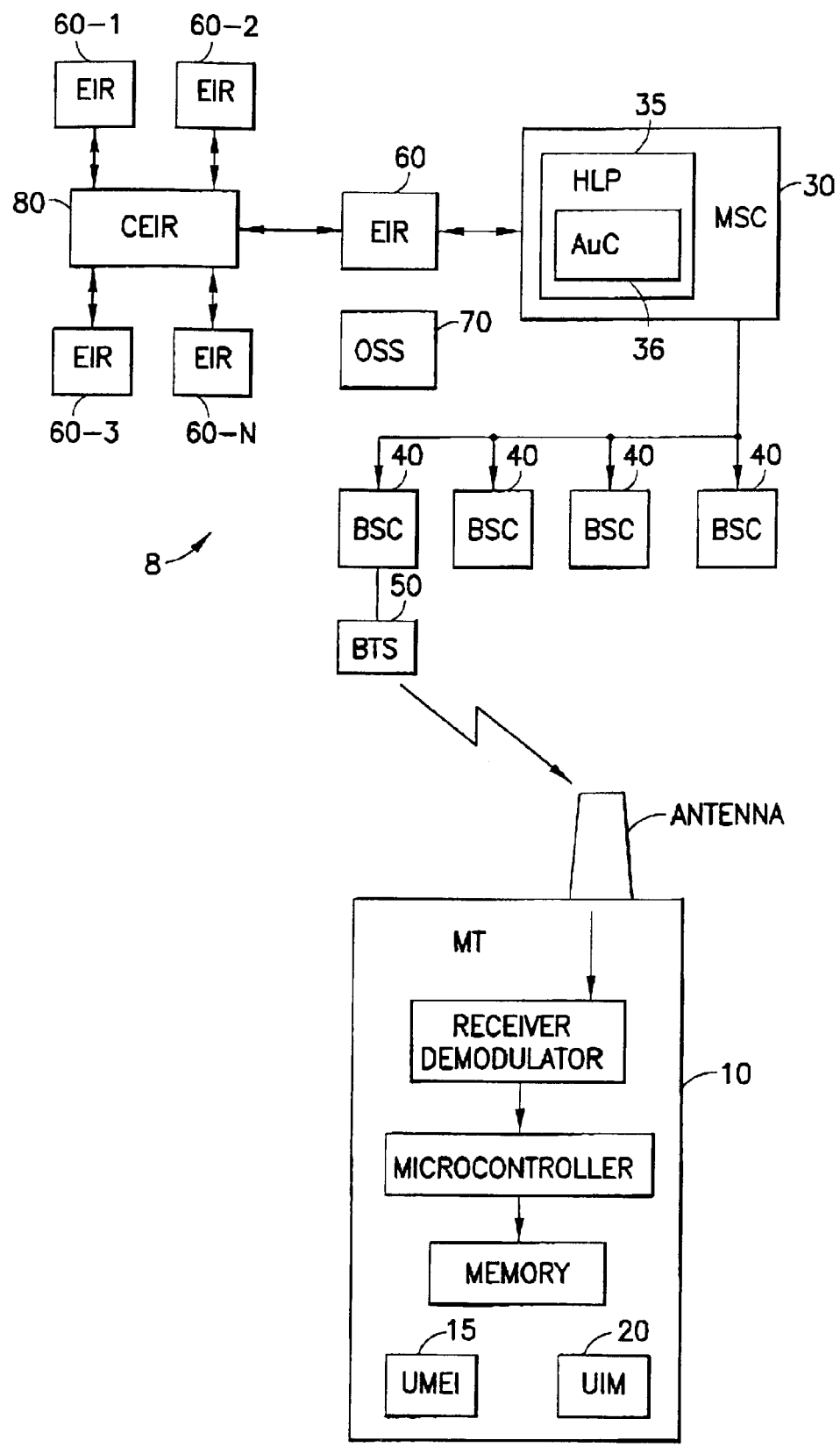
FIG. 1 is a block diagram illustrative of a communications network in accordance with embodiments of the invention.

Referring to FIG. 1, a communications network is shown including a mobile station (MS) 10 such as a mobile telephone and a switching network 8 containing mobile switching (MSC) center 30, a number of base station controllers (BSC) 40 for different cell sites in which the mobile station 10 can operate. An equipment identity register (EIR) 60 is connected to a common equipment identity register (CEIR) 80 which may be connected to other equipment identity registers 60-1, 60-2, 60-N associated with other switching networks and their associated mobile terminals. An operation sub-system (OSS) 70 may be provided to update the equipment identity register 60. Communication over the air to and from mobile terminals such as mobile station 10 is carried out via a base station transceiver unit (BTS) 50.

Each mobile station in the communications network such as mobile equipment (ME) 10 includes a user identity module (SIM) 20 that stores pre-programmed data unique to a particular user and an international mobile equipment identity unit (IMEI) 15. As discussed above, the SIM may be fixed or portable (e.g. a smart card). Each international mobile equipment identity 15 is unique to its mobile station 10 and is used to identify the mobile station 10 to the mobile switching center 30.

In FIG. 1, normal communication occurs between the communications network from the MSC 30 to a mobile telephone or other mobile terminal MS 10 via one of many base station controllers BSC 40 over one of its associated base transceiver systems BTS 50. Data may also be transferred in such a system.

The MS 10 contains a user identity module SIM 20 which stores a unique identifier of a specific user as well as any available authentication functions for that user. The MS 10 also contains a unique international mobile equipment identity IMFEI 15.

The MSC 30 contains or has communication channels to access the home location register HLR 35 for a specific user. The HLR 35 contains a functional subdivision known as the authentication center AuC 36 which manages the security data used for the authentication of users. Together, the AuC 36 functions of the HLR 35 and the corresponding authentication functions in the SIM 20 provide a relatively secure and robust means to validate or authenticate a user and thus prevent various types of fraudulent use.

The MSC 30 has communications channels to access an equipment identity register EIR 60 which is a database, which contains information regarding the validity and status of mobile equipment MS 10 via their international mobile equipment identifiers IMEI 15 known to the communication network.

Nokia Mobile Equipment Model Number 3395 has a SIM table which has 2 bits and can take on the following values to instruct the mobile station to configure itself for prepaid mode or for postpaid mode (sending a bill to the customer):
00—Postpaid mobile station
01—Postpaid mobile station
10—Postpaid mobile station
11—Prepaid mobile station These bits are sent by the MS to inform the network whenever the MS makes contact with the network (e.g. in the course of making or receiving a call) The mobile station powers up in prepaid mode if the bits are set to 11. If data provided over the air does not match the IMEI number stored in the mobile station, the mobile station does not function (e.g. if the network has transmitted the status of the MS as being 01 when the internally stored status is 11).

Figure 2:
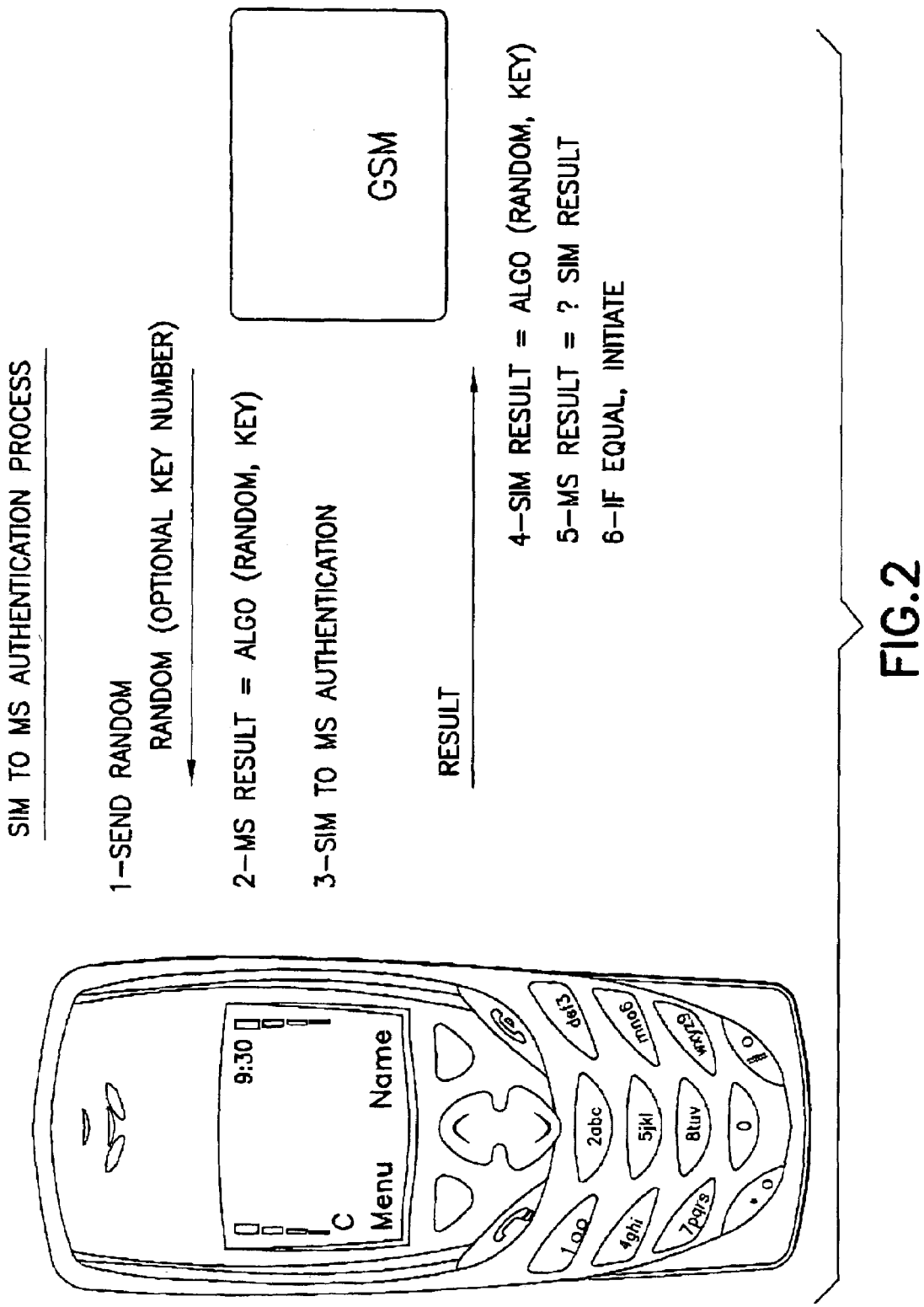
FIG. 2 is a flow chart illustrating an identity module authenticating a mobile station in accordance with embodiments of the invention.

FIG. 2 is a session diagram illustrative of the basic operations in which the SIM card 20 authenticates the mobile station 10. A unique challenge will be initiated by the SIM card 20 to externally verify that the terminal device is compatible with pre-paid operation by generating a random number and sending it to the ME 10 (the longer the value the more secure the challenge will be) [event 1]. When ME 10 receives this random value it processes the value [event 2] with a fixed key utilizing an algorithm stored inside the ME 10 at the factory. The algorithm may be unique or common to all units of a model. ME 10 returns the result of the computation back to the SIM card 20 [event 3]. While the ME 10 is processing this random value it received from the SIM 20, the SIM 20 performs its own computation using the same algorithm the MSE 10 has and the random value it sent to the ME 10 plus a fixed key programmed in the SIM card 20, whose value matches that of the fixed key in the ME [event 4].

If the ME=s response value which is passed back to the SIM 20 matches the response value generated in the SIM card 20, computation [event 5], then the SIM 20 is then free to initialize according to the GSM specifications and the MS operates normally [event 6]. If the value is different, then the SIM 20 may report (using SIM toolkit commands and the like) to the end-user that the terminal device ME 10 used is invalid.

The match could be made in various ways, e.g. by having the ME manufacturer provide a list of keys and algorithms to the prepaid carrier who embeds the list in the smart cards. Alternatively, the key and/or the algorithm could be based on the ME=s IMEI, with the smart card receiving the IMEI from the ME, performing a standard operation or complex mathematical calculation using algorithms implemented in both the SIM and ME to generate the key. The vendor of the ME and/or the cards will have to make a decision whether the gain in convenience outweighs the loss of security from having both the key and the algorithm based on the IMEI or other values identifying the ME. In a common business model, in which the MS manufacturer sells bulk quantities of MS to a pre-paid carrier, the MS=s may be customized to work only with smart cards supplied by the carrier. These specialized smart cards could be replenished, for example, by telephone or over the Internet. Alternatively, new cards could be purchased through alternate means, e.g. in a system where the customer buys X minutes that last for Y months, after which they expire.

Because the value sent from the SIM 20 to the ME 10 is an arbitrary value that is random for every terminal challenge verification, it makes SIM 20 to ME 10 protocol tracing and reverse engineering very difficult.

Therefore the three primary components to this solution that must be implemented in both the SIM 20 and ME 10 for a pre-paid scenario are:
1) a fixed key;
2) a random value; and
3) an algorithm that will take these two values and generate a response value.

The fixed key is a key whose value is resident on the SIM 20 and MS 10 and is agreed upon in advance and implemented in the manufacturing stages of the SIM 20 and ME 10. The manufacture of the ME will only put the code for processing the random value and the key in ME=s that are equipped with decrementing engines that can process the stored value number (number of prepaid minutes or amount of currency). The value of the fixed key could be diversified for every pre-paid subscription for added security but would be more difficult for logistics in mating the correct SIM 20 with the correct ME 10, or remain consistent for a given interval of time, subscriptions, etc. It is possible to have a list of fixed keys both in the SIM 20 and in the ME 10. When the SIM 20 sends the random value it can choose at that time to send a key number designator to be used. If a key number designator is not defined, then the mobile will generate a response based on the default key defined. Use of a set of keys permits flexibility in the marketing of handsets and of the prepaid services. Since the smart cards comply with a mechanical and electrical standard, the manufacturer of the ME may make arrangements with financial institutions that issue credit and debit cards to provide compatibility with a broad range of smart cards. Similarly, the provider of the smart cards may wish to permit its customers to use the ME from more than one manufacturer.

An optional feature of the invention is the use of the same smart card with different devices. For example, a company might wish to provide its sales force with a card that can be used to purchase fuel and also to make phone calls. In that case, the card would contain a system according to the previous discussion for challenging a ME before initiating telephone operation and also conventional system features for operating fuel pumps in a gasoline station or for operating any conventional vending system for vending a material product. If the SIM is removable and has a standard mechanical and electrical interface, it could be removed and inserted in the vending system. Alternatively, if a suitable financial arrangement has been made between the owner of the vending system and the provider of the SIM, the user could dial the telephone number of the vending system and pay for the product using the prepaid engines in the ME. For example, there could be two fixed keys and two algorithms, one for the telephone network and the other for use with the system controlling fuel sales or other vending systems.

Another optional feature of the invention is the provision for locking the smart card or other replaceable SIM to one particular ME. In that case, the first time that the challenge process is performed, the IMEI or some similar identifying information is stored in EPROM (Electrically Programmable Read Only Memory) in the SIM. Such memory can be written to once, but not changed after that. Thus, the ME, having established its suitability, is the only equipment with which the SIM will operate. This would be implemented by adding a step to the process in FIG. 2 of having the ME send its IMEI to the SIM, which compares that value with the stored value. If this optional feature is not implemented, the SIM will work with any ME that has the correct algorithm and fixed key.

FIG. 3 shows the steps in the process in more detail, with comments in the right column. Initially, the power is turned on in the MS (20-1). The ME sends an initiating signal to the SIM (20-2). The signal identifies the host as being an ME, where the SIM is meant to be used in a variety of contexts, such as purchasing gasoline.

The SIM fetches a key from a set of keys stored in it; e.g. using the model number or IMEI of the ME to pick out the correct key (20-3). If the ME has more than one key in it, e.g. it is programmed to work with more than one manufacturer=s SIM, the SIM sends back an identifying number that instructs the ME as to which key to use (20-4).

The SIM then sends a random number to the ME (20-5), and both the ME and the SIM process the random number with their keys (20-6, 7).

The ME sends its result to the SIM, which compares it with the SIM=s own result (20-9). If the results are the same, operation proceeds; if they are not the same, the SIM sends a notice to the user.

This fixed key is to remain secret and not to be readable and/or updatable within either the ME 10 or SIM 20 card. Fixed keys can be given to the pre-paid carrier either in the clear or ciphered depending on the carrier=s requirements.

The random value is the value generated by the SIM 20 and sent to the ME 10. The strength of the challenge is dependent on the strength of the algorithm, and length of the fixed key and random value.

The algorithm is a ROM resident algorithm utilizing technologies such as but not limited to XOR, COMP128, DES, 3DES or a pre-determined customized algorithm developed by the pre-paid carrier, manufacturer, or third party supplier. As one example, the algorithm could include a step of performing a decrement operation on the random number.

Although described in the context of particular embodiments, it will be apparent to those skilled in the art that a number of modifications and various changes to these teachings may occur. Thus, while the invention has been particularly shown and described with respect to one or more preferred embodiments thereof, it will be understood by those skilled in the art that certain modifications or changes, in form and shape, may be made therein without departing from the scope and spirit of the invention as set forth above.

What is claimed is:

1. A method for linking an identification (ID) unit having at least computation means and nonvolatile memory means with a terminal device so that the identification unit can only be used in a terminal device that satisfies a test, the method comprising:
generating a parameter in the ID unit;
sending the parameter from the ID unit to the terminal device;
receiving the parameter by the terminal device;
processing the parameter by the terminal device with a terminal device key utilizing an algorithm to generate a terminal response;
processing said parameter in the ID unit using said algorithm and said terminal device key to generate an ID reference;
comparing said terminal response and said ID reference; and
initializing the terminal device it said terminal response matches said ID reference.

2. The method of claim 1 further comprising
returning said terminal reference to the ID unit;
and performing the comparison in said ID unit.

3. The method of claim 1, in which said ID unit is a removable unit having a standard mechanical and electrical interface.

4. The method of claim 3, in which said ID unit is a smart card.

5. The method of claim 1, in which at least one of said key and said algorithm is unique to said terminal device and to said ID unit whereby said terminal device and said ID unit only work together.

6. The method of claim 5 further comprising
returning said terminal response to the ID unit;
and performing the comparison in said ID unit.

7. The method of claim 5, in which said ID unit is a removable unit having a standard mechanical and electrical interface.

8. The method of claim 3, in which said ID unit is a smart card.

9. The method of claim 1, in which said terminal device is a telephone ME, said terminal device key is fixed during manufacture of said ME and said ID unit contains a set of keys and means for specifying at least one of said set of keys.

10. The method of claim 9, in which said step of specifying at least one of said set of keys comprises processing an identifying parameter stored in said terminal device.

11. The method of claim 10, in which said ID unit is a removable unit having a standard mechanical and electrical interface.

12. The method of claim 11, in which said ID unit is a smart card.

13. A system comprising a terminal device and means for linking an identification (ID) unit having at least computation means and nonvolatile memory means with said terminal device so that the identification unit can only be used in a terminal device that satisfies a test, the system comprising means for:
generating a parameter in the ID unit;
sending the parameter from the ID unit to the terminal device;
receiving the parameter by the terminal device;
processing the parameter by the terminal device with a terminal device key utilizing an algorithm to generate a terminal response;
processing said parameter in the ID unit using said algorithm and said terminal device key to generate an ID reference; comparing said terminal response and said ID reference; and
initializing the terminal device if said terminal response matches said ID reference.

14. The system of claim 13 further comprising means for:
returning said terminal response to the ID unit; and
performing the comparison in said ID unit.

15. The system of claim 13, in which said ID unit is a removable unit having a standard mechanical and electrical interface.

16. The system of claim 15, in which said ID unit is a smart card.

17. The system of claim 13, in which at least one of said key and said algorithm is unique to said terminal device and to said ID unit, whereby said terminal device and said ID unit only work together.

18. The system of claim 17 further comprising means for:
returning said terminal reference to the ID unit; and
performing the comparison in said ID unit.

19. The system of claim 17, in which said ID unit is a removable unit having a standard mechanical and electrical interface.

20. The system of claim 19, in which said ID unit is a smart card.

21. The system of claim 13, in which said key is fixed during manufacture of said terminal device and said ID unit contains a set of keys and means for specifying at least one of said set of keys.

22. The system of claim 21, in which said means for specifying at least one of said set of keys comprises processing an identifying parameter stored in said terminal device.

23. The system of claim 21, in which said ID unit is a removable unit having a standard mechanical and electrical interface.

24. The system of claim 23, in which said ID unit is a smart card.

25. The method of claim 9, in which at least one of said set of keys in said ID unit is adapted for use with a ME communicating with a telephone network and at least one other of said set of keys is adapted for use with a second system other than a telephone network.

26. The method of claim 25, in which said second system is a vending system for vending a product.

27. A program storage medium readable by an identification unit comprising a computer program and a nonvolatile memory configured to communicate with a terminal device so that the identification unit can only be used in a device that satisfies a test, the medium embodying instructions executable by a computer for practicing a method comprising:
generating a parameter in the ID unit;
sending the parameter from the ID unit to the terminal device;
receiving the parameter by the terminal device;
processing the parameter by the terminal device with a terminal device key utilizing an algorithm to generate a terminal response;
processing said parameter in the ID unit using said algorithm and said terminal device key to generate an ID reference;
comparing said terminal response and said ID reference; and
initializing the terminal device if said terminal response matches said ID reference.

28. The program storage medium of claim 27, further comprising the step of
returning said terminal reference to the ID unit; and
performing the comparison in said ID Unit.

29. The program storage medium of claim 28, in which said ID unit is a removable unit having a standard mechanical and electrical interface.

30. The program storage medium of claim 29, in which said ID unit is a smart card.

31. The program storage medium of claim 27, in which at least one of said key and said algorithm is unique to said terminal device and to said ID unit, whereby said terminal device and said ID unit only work together.

32. The program storage medium of claim 31, in which said terminal device is a telephone ME, said terminal device key is fixed during manufacture of said ME and said ID unit contains a set of keys and means for specifying at least one of said set of keys.

* * * * *